Jan. 2, 1951   D. C. ADDICKS   2,536,408
FISH LURE
Filed Jan. 29, 1945
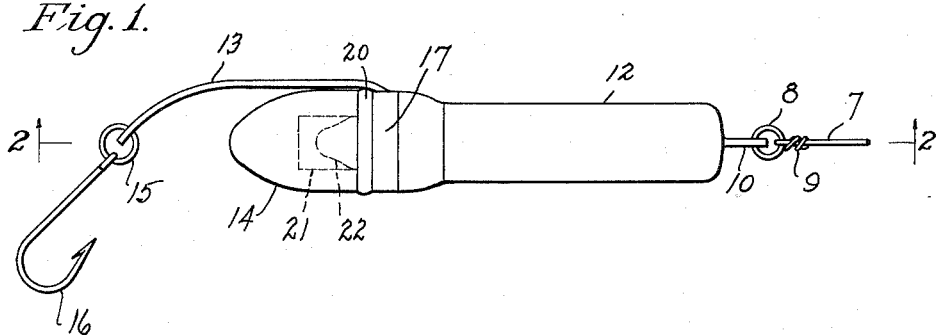
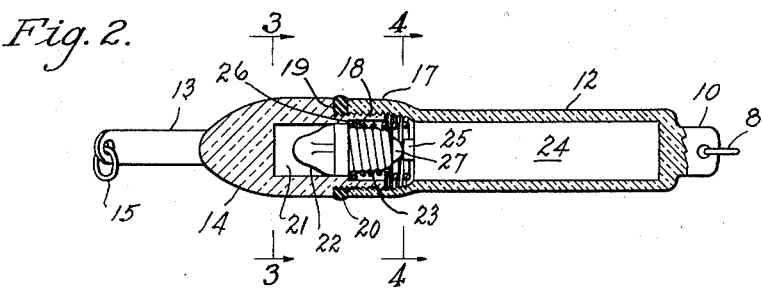
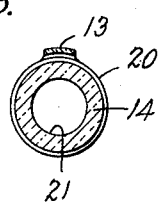   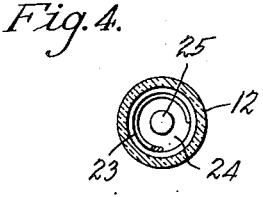
INVENTOR.
Diedrich C. Addicks
BY Carlos G. Stratton
ATTORNEY Patented Jan. 2, 1951

2,536,408

UNITED STATES PATENT OFFICE 2,536,408

FISH LURE

Diedrich C. Addicks, Maywood, Calif.

Application January 29, 1945, Serial No. 575,035

3 Claims. (Cl. 43—17.5)

My invention relates to a fish lure, and more particularly to an electrically illuminated lure.

An important object of the invention is to provide in an illuminated fish lure, an integral body that connects the hook with the line rather than to have a two piece body that is separable between the hook and the line. The advantage of my continuous body construction is that the connection for the light is not strained to a point where it leaks, when a fish with considerable fight is caught on the hook.

Another object is to resiliently support the light bulb in electrical contact with the battery and to arrange the resilient means to take up shocks on the lure, so as to protect the bulb against effects of such shocks.

Still another object is to provide a mounting for the light bulb that will support the light bulb at all times and yet permit the parts of the housing to be screwed closer together or farther apart depending upon the thickness of the water-proofing gasket.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is an elevational view of an embodiment of the foregoing objects.

Fig. 2 is a longitudinal section take on the line 2—2 of Fig. 1, looking in the direction of the arrows.

Figs. 3 and 4 are transverse sections taken on the lines 3—3 and 4—4, respectively, of Fig. 2.

Referring more in detail to the drawings, the reference number 7 indicates a line that connects the lure to a fish pole at the surface. A ring 8 joins a knot 9 at the end of the line 7 to an apertured lug 10 on the body 12 of the lure. The body 12 is preferably of plastic material having a certain buoyancy to aid in supporting its contained battery.

The opposite end of the body 12 from the ring 8 has integral therewith an arm 13 that extends around a translucent dome 14 screwed into the body 12. The dome 14 may be of transparent plastic, such as what is known in the trade as "Lucite." The dome 14 is preferably of plastic material that has the property of transmitting a light lengthwise of the dome and emitting the light from the end thereof rather than diffusing the light in all directions. "Lucite" has this property. The dome, moreover, is preferably colored red or blue.

The arm 13 has a curved end that carries a ring 15 that in turn connects with a fishhook 16. By this arrangement, the hook trails the line, to catch fish lured by the light. Although it is to be understood that the hook and line can be reversed if desired.

An enlarged head 17 on the body 12 is internally threaded to receive a correspondingly threaded nose 18 on the inner face of the dome 14. Between the end of the head 17 and a shoulder 19 on the dome 14, a resilient gasket 20 is compressed, to render the connection water-tight between the body and dome. The gasket 20 may be of neoprene.

A recess 21 within the dome 14 slidably houses a small electric light bulb 22. The bulb is supported by center turns of a coil spring 23. The spring abuts against the end of a battery 24, around a contact 25 and against a shoulder 26 in the dome 14. The battery is nested in the recess in the body 12. The spring 23 tends to hold the tip 27 against the contact 25 throughout the range of the different connections of the dome 14 with the body 12, in all degrees of compression of the gasket 20. The slidable connection of the bulb with the recess 21 permits the dome to be screwed down tight in water-proof relation to the body, in different degrees of compression of the gasket, without interference from the bulb.

The bulb 22 receives current from battery 24 through its central tip 27 and through its screw shell from spring 23 which is in electrical engagement with the outer shell case of the battery. Thus, the spring serves both as a conductor and to shock-mount the bulb.

In the use of my lure, a line and hook are connected thereto in the manner shown and described, or in a reverse manner. When a fish strikes at the light, it gets caught by the hook.

Since the arm 13 and body 12 are integral, or at least have a connection that does not effect the water-tightness of the body, the fighting of the fish will not twist or weaken the connection between the dome and body. Due to the sliding connection of the light bulb, the dome may be screwed down tight upon gaskets of different thicknesses, in order to secure a water-tight connection of the dome and body at all times. The center turns of the spring 23 resiliently support the light bulb and receive all endwise shocks upon the lure, rather than suddenly transmitting them to the light bulb. The spring tends at all times to keep the tip 27 of the bulb in engagement with the contact 25, irrespective of the position of the dome on the body.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A fish lure comprising a dielectric tubular body having an open end and an integrally closed end formed with an integral apertured lug adapted to connect with a fish line, a dry electric battery disposed within said body and having its terminals directed toward the open end of the body, a hollow transparent extension threadedly connected with the body and closing the open end thereof, a light bulb slidably mounted in the hollow of said extension and in electrical engagement with the battery, the light from said bulb being directed forwardly, a substantially rigid integral arm extending first laterally and then forwardly beyond the end of the extension, and a fishhook having an articulate connection with the end of said arm, whereby said body, its integral lug and the integral arm comprise a rigid, non-extensible and inarticulate connection between the fish line and the hook and whereby said hook is illuminated by said light bulb.

2. A fish lure comprising a dielectric tubular body having an open end and an integrally closed end formed with an integral apertured lug adapted to connect with a fish line, illuminating means carried by the body and including a transparent extension of said body and connected at the open end thereof, a substantially rigid integral arm extending first laterally and then forwardly beyond the end of the extension, and a fishhook having an articluate connection with the end of said arm, whereby said body, its integral lug and the integral arm comprise a rigid, nonextensible and inarticulate connection between the fish line and the hook and whereby said hook is illuminated by light passing through the mentioned extension.

3. A fish lure comprising a dielectric tubular body having an open end and an integrally closed end formed with an integral apertured lug adapted to connect with a fish line, a dry electric battery disposed within said body and having its terminals directed toward the open end of the body, a hollow transparent extension threadedly connected with the body and closing the open end thereof, a light bulb slidably mounted in the hollow of said extension, resilient means electrically engaged with the bulb and the battery to mount said bulb for movement under shock in the hollow of the extension, the light from said bulb being directed forwardly, a substantially rigid integral arm extending first laterally and then forwardly beyond the end of the extension, and a fishhook having an articulate connection with the end of said arm, whereby said body, its integral lug and the integral arm comprise a rigid, non-extensible and inarticulate connection between the fish line and the hook, whereby said hook is illuminated by light passing from the bulb through the transparent extension, and whereby said resilient means absorbs shocks transmitted to the bulb by a fish struggling to rid itself of the hook.

DIEDRICH C. ADDICKS.

REFERENCES CITED

The following references are of record in the file of this patent:

UNITED STATES PATENTS

| Number | Name | Date |
| --- | --- | --- |
| 999,559 | Hautala | Aug. 1, 1911 |
| 1,079,891 | Simms | Nov. 25, 1913 |
| 1,338,528 | Reinewald | Apr. 27, 1920 |
| 1,900,965 | Weiss | Mar. 14, 1933 |
| 2,190,791 | Larson | Feb. 20, 1940 |
| 2,197,372 | Bailey | Apr. 16, 1940 |
| 2,217,565 | Seigle et al. | Oct. 8, 1940 |
| 2,340,530 | Hefner | Feb. 1, 1944 |
| 2,358,576 | Jackell | Sept. 19, 1944 |